US012613452B2

(12) United States Patent
Jiang et al.

(10) Patent No.: US 12,613,452 B2
(45) Date of Patent: Apr. 28, 2026

(54) THERMAL IMAGING MODULE AND ELECTRONIC DEVICE

(71) Applicant: Hangzhou Microimage Software Co., Ltd., Hangzhou (CN)

(72) Inventors: Hongwei Jiang, Hangzhou (CN); Changwei Hu, Hangzhou (CN)

(73) Assignee: Hangzhou Microimage Software Co., Ltd., Hangzhou (CN)

( * ) Notice: Subject to any disclaimer, the term of this patent is extended or adjusted under 35 U.S.C. 154(b) by 68 days.

(21) Appl. No.: 18/849,327

(22) PCT Filed: Mar. 15, 2023

(86) PCT No.: PCT/CN2023/081644
§ 371 (c)(1),
(2) Date: Sep. 20, 2024

(87) PCT Pub. No.: WO2023/185477
PCT Pub. Date: Oct. 5, 2023

(65) Prior Publication Data
US 2025/0208487 A1 Jun. 26, 2025

(30) Foreign Application Priority Data

Mar. 28, 2022 (CN) .......................... 202210311007.X

(51) Int. Cl.
*G03B 9/08* (2021.01)
*H04N 23/23* (2023.01)
(Continued)

(52) U.S. Cl.
CPC .............. *G03B 9/08* (2013.01); *H04N 23/23* (2023.01); *H04N 23/51* (2023.01); *H04N 23/55* (2023.01)

(58) Field of Classification Search
CPC ........ H04N 23/57; H04N 23/54; H04N 23/55; H04N 23/68; H04N 23/687; H04N 23/50;
(Continued)

(56) References Cited

U.S. PATENT DOCUMENTS

| | | | |
|---|---|---|---|
| 2013/0141590 A1 | 6/2013 | Matsumoto | |
| 2022/0057594 A1* | 2/2022 | Chang .................... | G02B 7/003 |

FOREIGN PATENT DOCUMENTS

| | | |
|---|---|---|
| CN | 103091808 A | 5/2013 |
| CN | 108152910 A | 6/2018 |

(Continued)

*Primary Examiner* — Masum Billah
(74) *Attorney, Agent, or Firm* — Bret E. Field; Bozicevic, Field & Francis LLP

(57) ABSTRACT

A thermal imaging module and an electronic device. The thermal imaging module comprises a lens assembly, the lens assembly comprising a lens barrel and a lens, the lens barrel comprising a mounting part and an extension part connected to one side of the mounting part, the mounting part being provided with a light through hole, the lens being mounted on the mounting part, and the lens being arranged to cover the light through hole in the axial direction of the light through hole; a substrate, connected to the side of the extension part away from the mounting part, the substrate and the extension part defining an accommodating cavity; an infrared detector, located in the accommodating cavity and fixed to the side of the substrate facing the lens; and a correction shutter assembly, the correction shutter assembly being located on the light incident side of the infrared detector and being installed on the lens barrel, the correction shutter assembly comprising a correction blocking piece and a correction blocking piece movement mechanism, the correction blocking piece being arranged on the correction blocking piece movement mechanism, and the correction blocking piece movement mechanism being configured to drive the correction blocking piece to avoid or block the (Continued)

light through hole. The thermal imaging module disclosed in the embodiments of the application has fewer parts, so that the cumulative tolerance is less and the precision is higher.

18 Claims, 3 Drawing Sheets

(51) Int. Cl.
    *H04N 23/51*         (2023.01)
    *H04N 23/55*         (2023.01)

(58) Field of Classification Search
    CPC ........ H04N 23/51; H04N 23/67; H04N 23/20;
                                               H04N 23/23
    USPC .......................................................... 348/164
    See application file for complete search history.

(56) References Cited

FOREIGN PATENT DOCUMENTS

| CN | 208313441 U | | 1/2019 | |
|----|-------------|---|--------|---|
| CN | 111147699 A | * | 5/2020 | ............. H04N 23/57 |
| CN | 111147700 A | | 5/2020 | |
| CN | 210781069 U | | 6/2020 | |
| CN | 111866358 A | | 10/2020 | |
| CN | 211927103 U | | 11/2020 | |
| CN | 213041380 U | | 4/2021 | |
| CN | 213632412 U | | 7/2021 | |
| CN | 213932840 U | | 8/2021 | |
| CN | 113376788 A | | 9/2021 | |
| CN | 113566978 A | | 10/2021 | |
| CN | 114697503 A | | 7/2022 | |

* cited by examiner

THERMAL IMAGING MODULE AND ELECTRONIC DEVICE

The present application claims the priority to a Chinese patent application No. 202210311007. X filed with the China National Intellectual Property Administration (CNIPA) on Mar. 28, 2022 and entitled "THERMAL IMAG-ING MODULE AND ELECTRONIC DEVICE", which is incorporated herein by reference in its entirety.

TECHNICAL FIELD

This application relates to the technical field of imaging device, particularly to a thermal imaging module and an electronic device.

BACKGROUND

With the advancement of science and technology, more and more high-tech products are beginning to enter the mass production stage and are widely used by the majority of users. Taking thermal imaging device as an example, more and more civilian cameras and other devices are equipped with a thermal imaging device. The thermal imaging device usually includes a housing and a lens assembly. The lens assembly generally includes a lens holder and a lens. The lens is mounted on the lens holder, and during the process of assembling the imaging device, the housing is used to provide mounting and protection functions for the lens holder. However, this imaging device has a large number of components, resulting in a large cumulative tolerance during the assembly process, which will have a significant adverse impact on the accuracy of the imaging device.

SUMMARY

The present application discloses a thermal imaging module and an electronic device, the thermal imaging module has a relatively small number of components, a small cumulative tolerance and a high accuracy.

In order to solve the above problems, the present application adopts the following technical solutions.

In a first aspect, an embodiment of the present application discloses a thermal imaging module including:

a lens assembly including a lens barrel and a lens, wherein the lens barrel includes a mounting part and an extension part, the extension part is connected to one side of the mounting part, the mounting part is provided with a light through hole, the lens is mounted to the mounting part, and the lens is arranged to cover the light through hole in an axial direction of the light through hole;

a substrate, wherein the substrate is connected to one side of the extension part facing away from the mounting part, and the substrate and the extension part enclose an accommodating cavity;

an infrared detector, wherein the infrared detector is located inside the accommodating cavity and is fixed to one side of the substrate facing the lens;

a correction shutter assembly, wherein the correction shutter assembly is located on the light-incident side of the infrared detector and is mounted to the lens barrel, the correction shutter assembly includes a correction blocking plate and a correction blocking plate move-ment mechanism, the correction blocking plate is mounted to the correction blocking plate movement mechanism, and the correction blocking plate movement mechanism is configured to drive the correction blocking plate to avoid or block the light through hole.

In a second aspect, an embodiment of the present appli-cation discloses an electronic device including the above-mentioned thermal imaging module.

The technical solutions adopted in the present application can achieve the following beneficial effects.

The embodiments of the present application disclose a thermal imaging module including a lens assembly, a sub-strate, an infrared detector, and a correction shutter assem-bly. The lens barrel in the lens assembly includes a mounting part and an extension part. The lens in the lens assembly is mounted to the mounting part, and the extension part is connected to one side of the mounting part. The substrate is connected to one side of the extension part facing away from the mounting part, so that the extension part and the sub-strate enclose an accommodating cavity for accommodating the infrared detector. The infrared detector is fixed to one side of the substrate facing the lens, so that the infrared detector can provide imaging function. The correction shut-ter assembly is located on a light-incident side of the infrared detector, and is mounted to the lens barrel to provide correction for the infrared detector by using the correction shutter assembly, ensuring that the imaging accuracy of the infrared detector is always relatively high. At the same time, the correction shutter assembly includes a correction block-ing plate and a correction blocking plate movement mecha-nism. The correction blocking plate is mounted to the correction blocking plate movement mechanism, which can drive the correction blocking plate to move, so that the correction blocking plate can avoid or block the light through hole, thereby enabling the thermal imaging module to switch between a normal working state and a correction state.

As described above, in the thermal imaging module disclosed in the embodiments of the present application, the lens barrel of the lens assembly is directly connected to the substrate, serving as the "housing" of the entire thermal imaging module. The structure of the lens holder is no longer required, which can reduce the number of components in the entire thermal imaging module, thereby reducing the cumu-lative tolerance in the process of producing and assembling the thermal imaging module and improving the imaging accuracy of the thermal imaging module.

BRIEF DESCRIPTION OF THE DRAWINGS

In order to more clearly describe the technical solutions of the embodiments of the application and of the prior art, drawings needed in the embodiments and the prior art will be briefly described below. Obviously, the drawings described below are for only some embodiments of the present application, those skilled in the art can also obtain other drawings on the basis of these drawings without any creative efforts.

DESCRIPTION OF REFERENCE SIGNS

101—accommodating cavity, 111—mounting part, 111*a*—light through hole, 112—extension part, 120—lens,
200—substrate,
310—infrared detector, 320—electrical connector,
410—correction blocking plate, 420—correction shutter housing.

DETAILED DESCRIPTION

In order to make the objects, technical solutions, and advantages of the present application more clearly, the present application will be further described in detail below with reference to the accompanying drawings and embodiments. Obviously, the embodiments described are only some of the embodiments of the present application, not all of them. All other embodiments obtained by those skilled in the art based on the embodiments of the present application fall within the scope of the present application without making creative effort.

Firstly, the terms used in the embodiments of the present application are described:

Infrared detector: an optical sensitive component for sensing infrared radiation and outputting an infrared image.

Thermal imaging: i.e., infrared thermal imaging technology, which uses spectral radiation emitted by an observed object itself to obtain a target image, and mainly works in two atmospheric windows of 3 µm to 5 µm and 8 µm to 14 µm. The infrared thermal imaging core involved in the present patent works in the atmospheric window of 8 µm to 14 µm, which belongs to long wave radiation.

Thermal imaging module: a product that connects an infrared detector, a substrate, a lens, a structural component, etc. together and can be directly sold for customer integration, which is called as a detector module.

FPA: Focal Plane Array.

Non-uniformity of infrared focal plane array: when the target object is irradiated by a uniform radiation surface, due to differences in the materials used in the components, manufacturing processes, and radiation from other structural components, images output by individual detection units of a detector are not completely consistent.

Non-uniformity correction: by using a uniform reference object, the response characteristics of individual pixel elements on a detector focal plane are corrected to be as consistent as possible, eliminating defects caused by non-uniform factors in the image.

Shutter: a mechanism that provides a uniform reference object.

Figure 5:
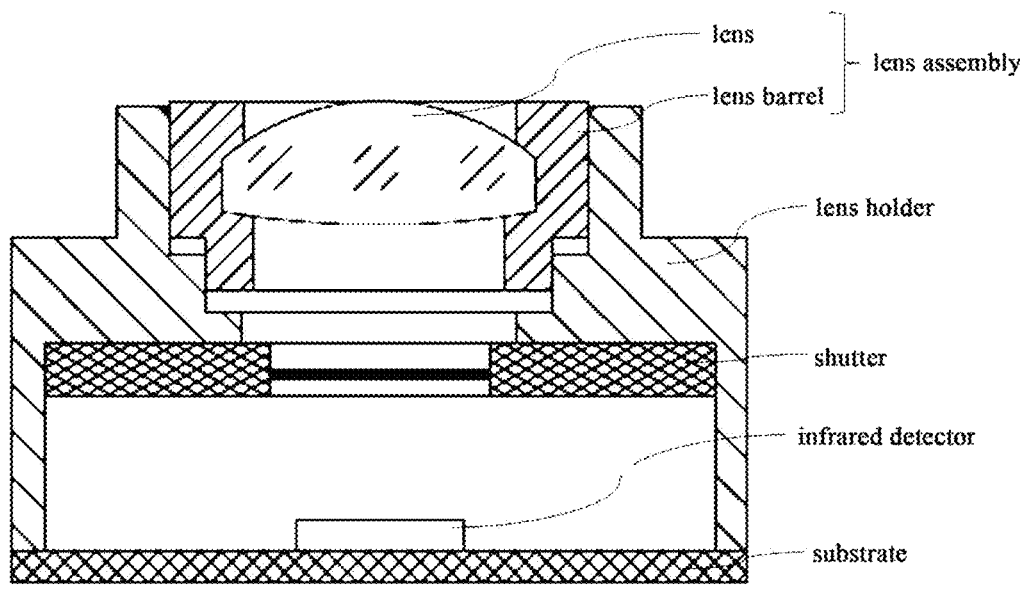
FIG. 5 is a structural schematic diagram of a thermal imaging module in the related art.

The infrared detector is packaged in a metal shell or a ceramic tube shell, and is connected to a circuit board by a gold wire. This packaging method does not require a metal shell or a ceramic tube shell, so the volume can be made very small, and is suitable for miniaturization and integration. Thus, a highly integrated and miniaturized infrared camera module was born, which integrates an infrared lens, a shutter assembly, an infrared detector, a substrate, and other components together. However, due to the proximity of a focal plane inside the infrared detector to an infrared window, if there is dust on the infrared window, spots will be formed on the image, affecting the quality of the image. The main structural components of the infrared module in related art are shown in FIG. 5. The infrared lens is mounted on an upper end face of a lens holder, and the shutter is mounted on a lower end face of the lens holder to form a lens assembly (including the lens, the lens holder, and the shutter). The infrared detector is mounted on the circuit board and electrically connected to the circuit board through the gold wire, forming a circuit board assembly (including the infrared detector and the circuit board). Since the lens and the shutter are independent functional components, the size of the shell protection needs to be increased, which will result in an increase in the size of the entire lens assembly. In addition, since the lens, the lens holder, and the shutter are independently produced and then assembled together, there are disadvantages such as large cumulative tolerance, low comprehensive accuracy, difficulty in dust control, and high production cost.

To solve at least one of the above problems, the embodiments of the present application provide a thermal imaging module and an electronic device. The technical solutions disclosed in various embodiments of the present application are further described in detail below with reference to the accompanying drawings.

As shown in FIGS. 1-4, the embodiments of the present application disclose a thermal imaging module, which can be applied in an electronic device. The thermal imaging module includes a lens assembly, a substrate 200, an infrared detector 310, and a correction shutter assembly.

The lens assembly includes a lens barrel and a lens 120. The lens barrel is the mounting foundation of the lens 120, and can provide protection for the lens 120, thereby increasing the service life of the lens 120. More specifically, as shown in FIGS. 1-4, the lens barrel includes a mounting part 111 and an extension part 112, the mounting part 111 is provided with a light through hole 111*a* to ensure that both ends of the mounting part 111 can be communicated to each other.

During the process of assembling the lens assembly, the lens 120 is mounted on the mounting part 111. Specifically, the lens 120 can be mounted inside the light through hole 111*a* of the mounting part 111 by embedding, or the lens 120 can be mounted on one end surface of the mounting part 111 by adhering or other methods, that is, the lens 120 can also be located outside the light through hole 111*a*. At the same time, the lens 120 covers the light through hole 111*a* and is arranged in the axial direction of the light through hole 111*a*. Specifically, the area of the lens 120 is equal to or greater than the area of the light through hole 111*a*, and any part of the edge of the lens 120 is located outside the corresponding part of the edge of the light through hole 111*a* (or in other words, any part of the edge of the lens 120 coincides with the corresponding part of the edge of the light through hole 111*a*). In other words, the projection of the edge of the lens 120 in the axial direction of the light through hole 111*a* covers the light through hole 111*a*, so that the light and thermal radiation on one side of the light through hole 111*a*, when entering the other side of the light through hole 111*a*, can pass through the lens 120 inside the light through hole 111*a*.

Specifically, the lens barrel can be made of a material such as plastic or metal, and the lens 120 can be formed of a transparent material such as plastic or glass. Moreover, the material of the lens 120 is selected as a material with poor heat absorption and release performance, which can improve the imaging accuracy of the thermal imaging module. The lens 120 can be a single lens, or the number of lenses 120 can be multiple to form a lens group, thereby improving the shooting performance of the thermal imaging module.

At the same time, as shown in FIGS. 1-4, the extension part 112 is connected to one side of the mounting part 111. The extension part 112 is a ring-shaped structural component, and specifically can be a circular ring-shaped structural component or a ring-shaped structural component with a rectangular cross-section or other shapes, so that the extension part 112 can enclose an accommodating cavity 101 with a substrate 200 mentioned below. Generally, the mounting part 111 and the extension part 112 can be regarded as the "housing" of the lens 120, and also serve as a part of the "housing" of the entire thermal imaging module. Together with the substrate 200 mentioned below, the mounting part 111 and the extension part 112 provide a storage space for a device such as an infrared detector 310. Considering that the additional assembly process between the components may have a negative impact on the accuracy of the entire thermal imaging module, the mounting part 111 and the extension part 112 optionally are formed as an integrally molded structural component. That is, the mounting part 111 and the extension part 112 can be formed in an integrally molded manner. Specifically, the mounting part 111 and the extension part 112 are formed in an integrally molded manner by using a material such as plastic or metal. In the case of adopting this technical solution, the overall accuracy of the mounting part 111 and the extension part 112 can be improved, and the processing difficulty thereof can be reduced. In addition, when the mounting part 111 and the extension part 112 are formed as the integrally molded structural component, the number of the components in the entire thermal imaging module can be reduced, thereby reducing the mounting processes and improving processing efficiency.

The substrate 200 serves as the mounting foundation for the infrared detector 310, and can be a flat structural component. The substrate 200 is connected to one side of the extension part 112 facing away from the mounting part 111, so that the substrate 200 and the extension part 112 enclose the accommodating cavity 101. The shape and size of substrate 200 correspond to the shape and size of extension part 112, so that the overall size of the thermal imaging module is relatively small. More specifically, the substrate 200 can be embedded inside the extension part 112, or the substrate 200 can be arranged on an end face of the extension part 112 facing away from the mounting part 111.

It should be noted that there is no clear physical boundary between the extension part 112 and the mounting part 111. The mounting part 111 is provided with the light through hole 111a, so that the mounting part 111 is actually a ring-shaped structural component. The structure of the mounting part 111 is similar to that of the extension part 112. Of course, the size of the light through hole 111a needs to correspond to the size of the lens 120, and the inner size of the extension part 112 also needs to correspond to the size of the infrared detector 310, ensuring that the infrared detector 310 and other structures can be mounted into the accommodating cavity 101. Moreover, while ensuring that the extension part 112 has the required accommodating capacity and structural strength, the wall thickness of the extension part 112 can be relatively small to reduce the processing cost of the extension part 112 and the thermal imaging module.

As described above, the infrared detector 310 is mounted inside the accommodating cavity 101, and the infrared detector 310 is fixed on one side of the substrate 200 facing the lens 120 so that the infrared detector 310 receives light and thermal radiation entering from the other side of the lens 120, and forms a corresponding image. Of course, during the use of the thermal imaging module, the infrared detector 310 can be connected to the processor and other devices through an electrical connector 320, so that signals received by the infrared detector 310 can be transmitted to the processor for processing the signals, or the processor can output the image contained in the signals received by the infrared detector 310. Additionally, the substrate 200 can be formed by using a conductive material such as metal, or the substrate 200 can include a circuit board, so that the imaging signals 310 can be electrically connected to the processor indirectly through the substrate 200.

It should be noted that in the process of deploying the components in the thermal imaging module, it is necessary to ensure that the lens 120 and the infrared detector 310 are correspondingly arranged, so as to ensure that the light or thermal radiation energy entering from the lens 120 can pass through the lens 120 and enter the infrared detector 310. More specifically, the center of lens 120 can be aligned with the center of infrared detector 310 on the same straight line, and the aforementioned straight line can be the axis of the light through hole 11a. In this case, it can be ensured that the imaging quality of the thermal imaging module is higher.

In order to ensure that the imaging accuracy of the thermal imaging module is relatively high, as shown in FIGS. 1-4, the thermal imaging module in the embodiments disclosed in the present application includes a correction shutter assembly located on the light-incident side of the infrared detector 310. The correction shutter assembly includes a correction blocking plate 410, to calibrate the imaging result of the infrared detector 310 by the correction blocking plate 410, so that in the event of errors in the imaging result of the infrared detector 310, the imaging process of the infrared detector 310 can be adaptively corrected to ensure that the imaging result of the infrared detector 310 is always relatively accurate.

Specifically, due to differences in manufacturing materials and the manufacturing process of the infrared detector 310, there may be non-uniformity in FPA, which refers to the non-uniformity of the infrared planar array. In this case, non-uniformity correction is necessary to prevent slight errors in the detection values of thermal radiation with the same output parameters at different positions on the infrared detector 310. Based on this, as described above, the thermal imaging module disclosed in the embodiments of the present application includes the correction shutter assembly, which includes a correction blocking plate 410. The thermal radiations generated at various positions on the correction blocking plate 410 are consistent. Therefore, during the operation of the thermal imaging module, the imaging result of the infrared detector 310 can be calibrated by the correction blocking plate 410, so that when there are differences in signals received at different positions on the infrared detector 310, the imaging uniformity of the infrared detector 310 can be corrected based on the aforementioned differences.

In addition, during the use of the thermal imaging module, the imaging result of the infrared detector 310 can be corrected by using the correction blocking plate in the correction shutter assembly at preset intervals. Alternatively, a sensor can be arranged in the thermal imaging module, and the sensor can specifically be a temperature sensor and like. When the temperature of the components such as the infrared detector 310 or the lens 120 in the thermal imaging module meets the preset range, the correction blocking plate 410 of the correction shutter assembly can be used to correct the imaging result of the infrared detector 310, ensuring that the imaging accuracy of the thermal imaging module is always relatively high.

Of course, as mentioned above, the correction blocking plate 410 is a component used to correct the operating parameters of the infrared detector 310. Therefore, it is necessary to ensure that the correction blocking plate 410 does not interfere with the process of the thermal imaging module capturing objects outside the thermal imaging module. Based on this, in the process of configuring the correction block 410, it is necessary to enable the correction blocking plate 410 to have the ability to avoid and block the light through hole 111*a*, and then in the process of calibrating the imaging parameters of the infrared detector 310, the correction blocking plate 410 can be located within the light through hole 111*a*, so that the thermal radiation generated by the correction blocking plate 410 can be captured by the infrared detector 310. During the process of the thermal imaging module capturing objects outside of the thermal imaging module itself, the correction blocking plate can be avoided from the light through hole 111*a*, so that the thermal radiation outside the thermal imaging module can pass through the light through hole 111*a* and be captured by the infrared detector 310 without being blocked by the correction blocking plate 410.

In a specific embodiment, the correction shutter assembly can include a correction blocking plate movement mechanism and the correction blocking plate 410 described above. The correction blocking plate 410 is mounted to the correction blocking plate movement mechanism, the correction blocking plate movement mechanism is configured to drive the correction blocking plate 410 to avoid or block the light through hole 111*a*. Specifically, the correction blocking plate movement mechanism can be a translational movement mechanism or a swinging movement mechanism, etc., to drive the correction blocking plate 410 to move relative to the light through hole 111*a* in translational or swinging manner, so that the correction blocking plate 410 has the ability to avoid or block the light through hole 111*a*.

An embodiment of the present application discloses a thermal imaging module including a lens assembly, a substrate 200, an infrared detector 310, and a correction shutter assembly. The lens barrel in the lens assembly includes a mounting part 111 and an extension part 112. The lens 120 in the lens assembly is mounted to the mounting part 111, and the extension part 112 is connected to one side of the mounting part 111. The substrate 200 is connected to one side of the extension part 112 facing away from the mounting part 111, so that the extension part 112 and the substrate 200 enclose an accommodating cavity 101 for accommodating the infrared detector 310. The infrared detector 310 is fixed on one side of the substrate 200 facing the lens 120, so that the infrared detector 310 can provide imaging function. The correction shutter assembly is located on the light-incident side of the infrared detector 310, and mounted to the lens barrel to provide correction for the infrared detector 310 by using the correction shutter assembly, ensuring that the imaging accuracy of the infrared detector 310 is always relatively high. At the same time, the correction shutter assembly includes a correction blocking plate 410 and a correction blocking plate movement mechanism. The correction shutter 410 is mounted to the correction blocking plate movement mechanism. The correction blocking plate movement mechanism can drive the correction blocking plate 410 to move, so that the correction blocking plate 410 avoids or blocks the light through hole 111*a*, thereby enabling the thermal imaging module to switch between a normal working state and a correction state.

As described above, in the thermal imaging module disclosed in the embodiments of the present application, the lens barrel of the lens assembly is directly connected to the substrate 200 as the "housing" of the entire thermal imaging module. This can reduce the number of the components in the entire thermal imaging module, thereby reducing the cumulative error during the production and assembly process of the thermal imaging module and improving the imaging accuracy of the thermal imaging module.

Figures 1, 2:
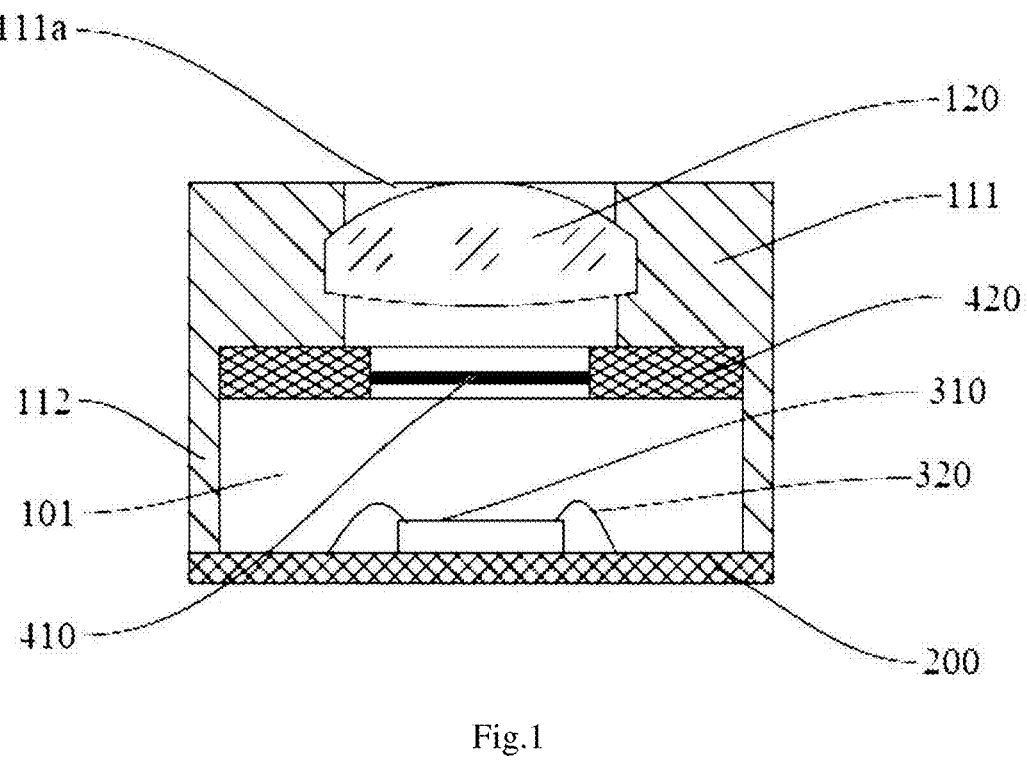
FIG. 1 is a structural schematic diagram of a thermal imaging module disclosed in an embodiment of the present application.
FIG. 2 is a further structural schematic diagram of a thermal imaging module disclosed in an embodiment of the present application.

Optionally, as shown in FIGS. 1 and 2, in the thermal imaging module disclosed in the embodiments of the present application, the correction shutter assembly also includes a correction shutter housing 420, which is mounted to the lens barrel. The correction blocking plate movement mechanism is mounted to the correction shutter housing 420, such that the correction shutter assembly forms an integrated assembly. The correction blocking plate 410 and the correction blocking plate movement mechanism are mounted to the lens barrel by using the correction shutter housing 420 to complete the mounting work of the correction shutter assembly. At the same time, in the thermal imaging module disclosed in an embodiment of the present application, the correction blocking plate movement mechanism is configured to drive the correction blocking plate 410 to move relative to the correction shutter housing 420, so that the correction blocking plate 410 avoids or blocks the light through hole 111*a*. That is, the correction shutter assembly can provide its own function without relying on other structural components in the thermal imaging module, but by using the correction shutter housing 420 in the correction shutter assembly as a driving reference to drive the correction blocking plate 410 to move under the driving of the correction blocking plate movement mechanism. More intuitively, in an embodiment of the present application, the correction shutter assembly can be an independent finished product.

Specifically, the correction shutter housing 420 can be formed with a hard material such as plastic or metal. The correction blocking plate movement mechanism is mounted to the correction shutter housing 420 which is provided with a perforation. The correction blocking plate 410 is mounted in the perforation and connected to the correction blocking plate movement mechanism, so that when the correction blocking plate 410 is driven by the correction blocking plate movement mechanism to move, the perforation can be closed by the correction blocking plate 410. Correspondingly, when the correction blocking plate movement mechanism moves in the opposite direction, at least a part of the perforation can be avoided by the correction blocking plate 410. Correspondingly, during the process of assembling the correction shutter housing 420 and the lens barrel, the aforementioned perforation and the light through hole 111*a* need to be arranged relative to each other to ensure that the correction blocking plate 410 still has the ability to avoid and block the light through hole 111*a*.

Optionally, as shown in FIG. 1, the correction shutter housing 420 is located on the light-emitting side of the lens 120. In this case, the light and thermal radiation outside the thermal imaging module pass through the lens 120 and then pass through the position where the correction shutter assembly is located. In this case, the lens barrel and the substrate 200 can be used to provide protection for the correction blocking plate 410, thereby preventing the correction blocking plate 410 from being easily affected by an external environmental pollution and affecting the calibration accuracy of the correction blocking plate 410.

Specifically, a mounting slot and other structures can be arranged in the mounting part 111 of the lens barrel to provide a mounting space for the correction shutter housing 420, so that the correction shutter assembly can be mounted on the mounting part 111. In a further embodiment of the present application, as shown in FIG. 1, the correction shutter housing 420 can be located inside the accommodating cavity 101. In this case, the correction shutter housing 420 and the correction blocking plate 410 are both located on the light-emitting side of the lens 120. By adopting this technical solution, the correction shutter housing 420 can be sent into the accommodating cavity 101 from the side of the extension part 112 facing away from the mounting part 111, and the correction shutter housing 420 is connected to an inner wall of the lens barrel or a surface of the substrate 200, which can reduce the assembly difficulty between the correction shutter assembly and the lens barrel. The thermal imaging module in this embodiment can be applied to the vast majority of angles of optical field of view, including but not limited to the following angles of field of view (horizontal field of view): 25°, 50°, 90°, 120°.

Optionally, in the process of fixing the correction shutter housing 420, in order to prevent the interference of the arrangement of the correction shutter assembly on the normal operation of the infrared detector 310, the correction shutter housing 420 can be fixed on a side wall of the extension part 112 instead of the substrate 200. More specifically, the correction shutter housing 420 can be fixed on an inner wall of the accommodating cavity 101, that is, an inner wall of the extension part 112, by adhering or other methods, so that the correction shutter housing 420 can form a stable fixed connection with the lens barrel. Additionally, in the process of arranging the correction shutter housing 420, the distance between the correction shutter housing 420 and the substrate 200 can be a preset distance greater than zero, and the correction shutter housing 420 can also be provided with a preset distance from the mounting part 111.

In a further embodiment of the present application, optionally, as shown in FIG. 1, the correction shutter housing 420 is attached to a surface of the mounting part 111 facing the substrate 200. That is, the distance between the correction shutter housing 420 and the mounting part 111 is basically zero, which maximizes the distance between the correction shutter housing 420 and the substrate 200 (or the infrared detector 310), thereby minimizing the interference of thermal radiation generated by the correction shutter assembly on the normal operation of the infrared detector 310. Moreover, in the case of adopting the above technical solution, the distance between the correction blocking plate 410 and the lens 120 is relatively small, and thus the temperature difference between the correction blocking plate 410 and the lens 120 is relatively small. Therefore, after calibrating the accuracy of the imaging result of the infrared detector 310 by using the correction blocking plate 410, the imaging result of the thermal radiation passing through the lens 120 with a temperature that is basically the same as that of the correction blocking plate 410 by the infrared detector 310 can be more accurate.

Additionally, in the case of adopting the above technical solution, the correction shutter housing 420 can be fixed on the mounting part 111 and the extension part 112 by adhering, or can be fixed on the mounting part 111 by a threaded connector or other components, achieving the purpose of fixing the correction shutter housing 420 to the lens barrel.

As shown in FIG. 2, in a further embodiment of the present application, the correction shutter housing 420 is located on the light-incident side of the lens 120, and is mounted to the mounting part 111. That is, the correction shutter housing 420 is fixed to one end of the mounting part 111 facing away from the extension part 112. Light and thermal radiation first pass through the position where the correction shutter assembly is located, then pass through the lens 120 and enter the infrared detector 310.

In this embodiment, the correction shutter housing 420 can also be fixedly connected to the mounting part 111 by adhering or a threaded connector. Additionally, in the case of adopting the technical solution disclosed in this embodiment, the correction blocking plate 410 is located outside the accommodating cavity 101 of the thermal imaging module, and the lens 120 is blocked between the correction blocking plate 410 and the infrared detector 310. This can prevent the possibility of particles and dust falling onto the infrared detector 310 during the movement of the correction blocking plate 410 driven by the correction blocking plate movement mechanism due to the absence of an obstruction between the correction blocking plate 410 and the infrared detector 310, thereby preventing image defects such as dark spots and circles in the infrared detector 310 and greatly reducing the failure rate of the thermal imaging module. The thermal imaging module in this embodiment can be applied to a small angle of optical field of view, such as an angle of field of view within 50° of the horizontal field of view.

At the same time, when using the thermal imaging module disclosed in the embodiment of the present application, since the correction shutter assembly is located outside the accommodating cavity 101, when the size of the correction shutter assembly remains unchanged, compared to the technical solution where the correction shutter assembly is mounted inside the accommodating cavity 101, by using the technical solution disclosed in this embodiment, the size of the accommodating cavity 101 (and the extension part 112) in a direction perpendicular to the axial direction of the light through hole 111a can be further reduced, which can further reduce the size of the entire thermal imaging module and enable the thermal imaging module to better develop towards miniaturization.

Figure 3:
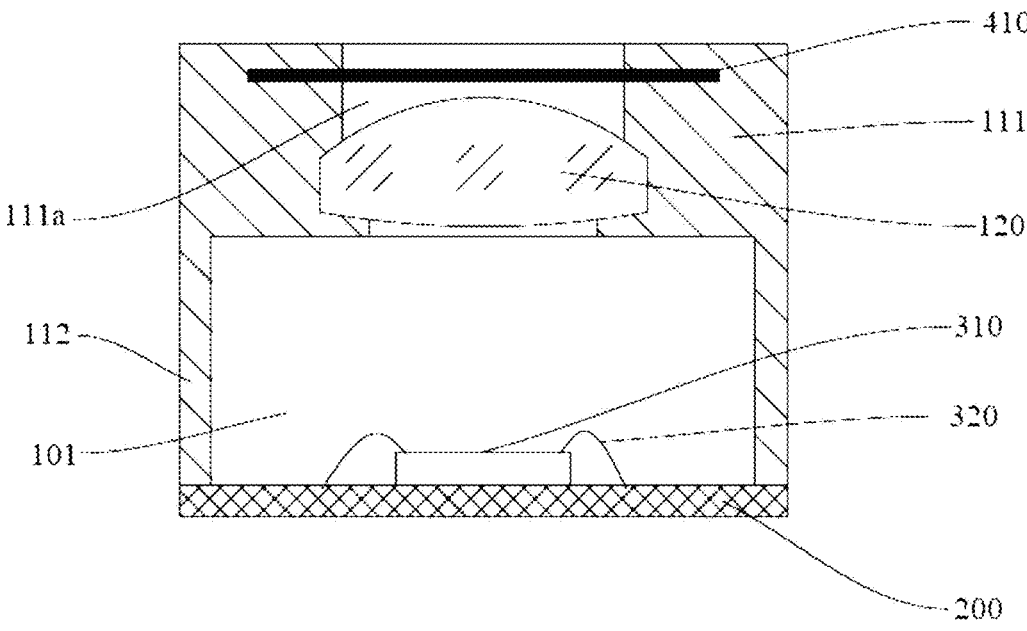
FIG. 3 is a further structural schematic diagram of a thermal imaging module disclosed in an embodiment of the present application.
Figure 4:
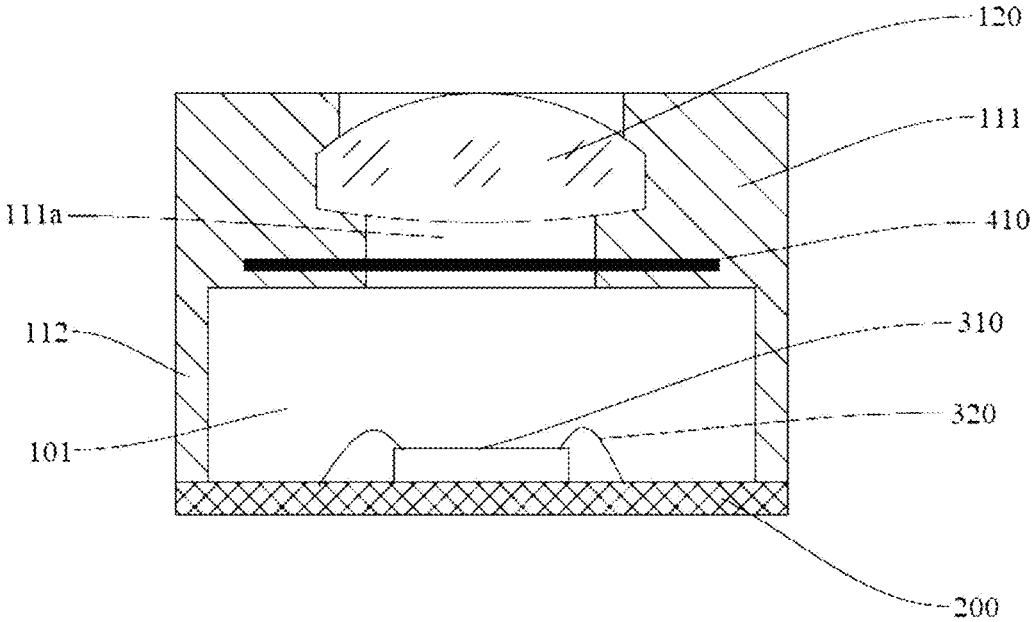
FIG. 4 is a further structural schematic diagram of a thermal imaging module disclosed in an embodiment of the present application.

In order to further reduce the cumulative error generated in the process of assembling the thermal imaging module, as shown in FIGS. 3 and 4, other structural components in the thermal imaging module can be optionally used as the mounting basis for the correction shutter assembly, to achieve the purpose of controlling the movement of the correction blocking plate 410 with respect to the light through hole 111a. Specifically, in an embodiment of the present application, the correction blocking plate movement mechanism is mounted to the lens barrel, and the correction blocking plate movement mechanism is configured to drive the correction blocking plate 410 to move relative to the lens barrel, so that the correction blocking plate movement mechanism can use the lens barrel as the driving basis to drive the correction blocking plate 410 to move relative to the light through hole 111a, in order to avoid or block the light through hole 111a. In this embodiment, the correction shutter assembly in the process of providing its own function needs to rely on other structural components such as the lens barrel in the thermal imaging module, so as to use the lens barrel as a driving reference to drive the correction shutter 410 to move relative to the lens barrel under the driving of the correction shutter movement mechanism. In the embodiments of the present application, the correction shutter assembly is essentially a non-independent assembly.

Compared to the technical solution disclosed in the above embodiments, in which the correction shutter movement mechanism is indirectly installed on the lens barrel through the correction shutter housing 420, a technical solution disclosed in an embodiment of the present application can further remove the correction shutter housing 420 used to mount the correction shutter movement mechanism. On the one hand, it can further reduce the component cost of the thermal imaging module, and on the other hand, it can further reduce the number of components in the thermal imaging module, thereby reducing the number of assembly processes between components and achieving the goal of reducing the cumulative tolerance generated in the process of producing the thermal imaging module. Additionally, in the case of adopting the technical solution disclosed in the embodiment of the present application, since the correction blocking plate movement mechanism is directly mounted to the lens barrel, and thus the overall size of the lens barrel and the thermal imaging module can be relatively smaller, enabling the thermal imaging module to better develop towards miniaturization.

Furthermore, as shown in FIG. 3, the correction shutter assembly can be positioned on the light-incident side of the lens 120. In this case, correction shutter assembly 410 and the infrared detector 310 are isolated from each other through the lens 120, thereby preventing particles and dust that may be generated during the operation of the correction shutter assembly 410 from falling onto the infrared detector 310, and thereby preventing image defects such as dark spots and circles in the infrared detector 310, which can greatly reduce the failure rate of the thermal imaging module. The thermal imaging module in this embodiment can be applied to a small angle of optical field of view, such as an angle of field of view within 50° of the horizontal field of view. Specifically, in the process of assembling the correction shutter assembly and the lens barrel, multiple step structures can be arranged on the light-incident side of the lens barrel based on the dimensions of the correction shutter assembly and the lens 120, and the lens 120 and the correction shutter assembly can be sequentially mounted at the step structures. At the same time, by adhering or clamping via a clamper, it is ensured that the lens 120 and the correction shutter assembly can both form a stable fixed fit with the lens barrel, achieving the purpose of the lens 120 and the correction shutter assembly being both relatively fixed with the lens barrel.

In a further embodiment of the present application, optionally, as shown in FIG. 4, the correction shutter assembly is located on the light-emitting side of the lens 120. In this case, the correction shutter assembly is located in a cavity surrounded by the lens barrel, the lens 120, and the substrate 200, so that the correction shutter assembly can be protected by the lens barrel, the lens 120, and the substrate 200, preventing the calibration accuracy of the correction shutter assembly from being easily affected by external environmental pollution.

In the case of the correction shutter assembly located on the light-emitting side of lens 120, the correction shutter assembly can be mounted on the inner wall of the extension part 112. In a further embodiment of the present application, as shown in FIG. 4, the correction shutter assembly is optionally mounted on the mounting part 111, so that the distance between the correction shutter assembly and the lens 120 is relatively close, and thus the temperature difference between the correction shutter assembly and the lens 120 is relatively small. After calibrating the accuracy of the imaging result of the infrared detector 310 by using the correction shutter assembly, the imaging result of the thermal radiation passing through the lens 120 with a temperature that is basically the same as that of the correction shutter assembly by the infrared detector 310 can be more accurate. Moreover, in the case of adopting the technical solution disclosed in the embodiment of the present application, the distance between the correction shutter assembly and the infrared detector 310 can be relatively far to prevent the radiation generated by the correction shutter assembly from interfering with the normal operation of the infrared detector 310, thereby ensuring that the infrared detector 310 has a high imaging accuracy. The thermal imaging module in this embodiment can be applied to the vast majority of angles of optical field of view, including but not limited to the following angles of field of view (horizontal field of view): 25°, 50°, 90°, 120°.

Similarly, in the case where the correction shutter assembly is located on the light-emitting side of the lens 120, multiple step structures can be correspondingly formed on the mounting part 111 based on the dimensions of the lens 120 and the correction shutter assembly, and the lens 120 and the correction shutter assembly can be respectively mounted at the corresponding step structures in the mounting part 111 from the side where the extension part 112 is located. In addition, by adhering or clamping via a clamper, it can also be ensured that the lens 120 and the correction shutter assembly can be fixed at the corresponding positions of the mounting part 111 in the lens barrel.

Based on the thermal imaging module disclosed in any one of the above embodiments, the present application also discloses an electronic device including any one of the above thermal imaging modules. Optionally, the electronic device includes a display module and a processor. Both the infrared detector 310 and the display module can be connected to the processor. The processor can process a light signal and/or a thermal radiation signal received by the infrared detector 310 and form a corresponding image to be displayed on the display module.

The focus of the previous embodiments in the present application is on the differences between the individual embodiments. As long as the optimization features between the individual embodiments are not contradictory, they can be combined to form a more preferred embodiment. Considering the simplicity of the writing, they will not be repeated here.

The above description is only preferred embodiments of the present application and is not intended to limit the present application. Any modifications, equivalent substitutions, improvements, etc. made within the spirit and principles of the present application should be included within the claimed scope of the present application.

The invention claimed is:

1. A thermal imaging module, wherein the thermal imaging module comprises:

a lens assembly comprising a lens barrel and a lens, wherein the lens barrel comprises a mounting part and an extension part, the extension part is connected to one side of the mounting part, the mounting part is provided with a light through hole, the lens is mounted to the mounting part, and the lens is arranged to cover the light through hole in an axial direction of the light through hole;

a substrate, wherein the substrate is connected to one side of the extension part facing away from the mounting part, and the substrate and the extension part enclose an accommodating cavity;

an infrared detector, wherein the infrared detector is located inside the accommodating cavity and is fixed to one side of the substrate facing the lens;

a correction shutter assembly, wherein the correction shutter assembly is located on a light-incident side of the infrared detector and is mounted to the lens barrel, the correction shutter assembly comprises a correction blocking plate and a correction blocking plate movement mechanism, the correction blocking plate is mounted to the correction blocking plate movement mechanism, and the correction blocking plate movement mechanism is configured to drive the correction blocking plate to avoid or block the light through hole.

2. The thermal imaging module according to claim 1, wherein the correction shutter assembly further comprises a correction shutter housing, the correction shutter housing is mounted to the lens barrel, and the correction blocking plate movement mechanism is mounted to the correction shutter housing, and the correction blocking plate movement mechanism is configured to drive the correction blocking plate to move relative to the correction shutter housing, in order to avoid or block the light through hole.

3. The thermal imaging module according to claim 2, wherein the correction shutter housing is located on a light-emitting side of the lens.

4. The thermal imaging module according to claim 3, wherein the correction shutter housing is located inside the accommodating cavity;

the correction shutter housing is attached to a surface of the mounting part facing the substrate.

5. The thermal imaging module according to claim 2, wherein the correction shutter assembly is located on a light-incident side of the lens, and the correction shutter housing is mounted to the mounting part.

6. The thermal imaging module according to claim 1, wherein the correction blocking plate movement mechanism is mounted to the lens barrel, and the correction blocking plate movement mechanism is configured to drive the correction blocking plate to move relative to the lens barrel, in order to avoid or block the light through hole.

7. The thermal imaging module according to claim 6, wherein the correction shutter assembly is located on a light-emitting side of the lens.

8. The thermal imaging module according to claim 6, wherein the correction shutter assembly is located on a light-incident side of the lens.

9. The thermal imaging module according to claim 4, wherein the mounting part and the extension part are formed as an integrally molded structural component.

10. An electronic device, wherein the electronic device comprises a thermal imaging module, wherein the thermal imaging module comprises:

a lens assembly comprising a lens barrel and a lens, wherein the lens barrel comprises a mounting part and an extension part, the extension part is connected to one side of the mounting part, the mounting part is provided with a light through hole, the lens is mounted to the mounting part, and the lens is arranged to cover the light through hole in an axial direction of the light through hole;

a substrate, wherein the substrate is connected to one side of the extension part facing away from the mounting part, and the substrate and the extension part enclose an accommodating cavity;

an infrared detector, wherein the infrared detector is located inside the accommodating cavity and is fixed to one side of the substrate facing the lens;

a correction shutter assembly, wherein the correction shutter assembly is located on a light-incident side of the infrared detector and is mounted to the lens barrel, the correction shutter assembly comprises a correction blocking plate and a correction blocking plate movement mechanism, the correction blocking plate is mounted to the correction blocking plate movement mechanism, and the correction blocking plate movement mechanism is configured to drive the correction blocking plate to avoid or block the light through hole.

11. The electronic device according to claim 10, wherein the correction shutter assembly further comprises a correction shutter housing, the correction shutter housing is mounted to the lens barrel, and the correction blocking plate movement mechanism is mounted to the correction shutter housing, and the correction blocking plate movement mechanism is configured to drive the correction blocking plate to move relative to the correction shutter housing, in order to avoid or block the light through hole.

12. The electronic device according to claim 11, wherein the correction shutter housing is located on a light-emitting side of the lens.

13. The electronic device according to claim 12, wherein the correction shutter housing is located inside the accommodating cavity;

the correction shutter housing is attached to a surface of the mounting part facing the substrate.

14. The electronic device according to claim 11, wherein the correction shutter assembly is located on a light-incident side of the lens, and the correction shutter housing is mounted to the mounting part.

15. The electronic device according to claim 10, wherein the correction blocking plate movement mechanism is mounted to the lens barrel, and the correction blocking plate movement mechanism is configured to drive the correction blocking plate to move relative to the lens barrel, in order to avoid or block the light through hole.

16. The electronic device according to claim 15, wherein the correction shutter assembly is located on a light-emitting side of the lens.

17. The electronic device according to claim 15, wherein the correction shutter assembly is located on a light-incident side of the lens.

18. The electronic device according to claim 13, wherein the mounting part and the extension part are formed as an integrally molded structural component.

* * * * *